United States Patent
Lang

(10) Patent No.: US 10,850,830 B2
(45) Date of Patent: Dec. 1, 2020

(54) THRUST REVERSAL ON AIRCRAFT FUSELAGE WITH A WING PROFILE

(71) Applicant: Dieter Lang, Mohlsdorf-Teichwolframsdorf (DE)

(72) Inventor: Dieter Lang, Mohlsdorf-Teichwolframsdorf (DE)

( * ) Notice: Subject to any disclaimer, the term of this patent is extended or adjusted under 35 U.S.C. 154(b) by 254 days.

(21) Appl. No.: 16/184,218

(22) Filed: Nov. 8, 2018

(65) Prior Publication Data
US 2019/0256192 A1 Aug. 22, 2019

(30) Foreign Application Priority Data
Feb. 16, 2018 (DE) .................. 10 2018 001 247

(51) Int. Cl.
| | | |
|---|---|---|
| *B64C 9/32* | (2006.01) | |
| *B64D 27/14* | (2006.01) | |
| *B64C 30/00* | (2006.01) | |
| *B64C 1/00* | (2006.01) | |
| *B64C 15/02* | (2006.01) | |
| *F02K 1/62* | (2006.01) | |
| *F02K 1/58* | (2006.01) | |
| *F02K 1/56* | (2006.01) | |
| *F02K 1/32* | (2006.01) | |

(52) U.S. Cl.
CPC ............ *B64C 9/326* (2013.01); *B64C 1/0009* (2013.01); *B64C 15/02* (2013.01); *B64C 30/00* (2013.01); *B64D 27/14* (2013.01); *F02K 1/32* (2013.01); *F02K 1/566* (2013.01); *F02K 1/58* (2013.01); *F02K 1/62* (2013.01); *B64C 2001/0045* (2013.01)

(58) Field of Classification Search
CPC ..... F02K 1/32; F02K 1/54; F02K 1/56; F02K 1/563; F02K 1/566; F02K 1/58; F02K 1/60; F02K 1/605; F02K 1/62; F02K 1/625; B64C 30/00; B64C 9/326; B64C 9/323; B64C 9/32; B64C 9/38
See application file for complete search history.

(56) References Cited

U.S. PATENT DOCUMENTS

| | | | | |
|---|---|---|---|---|
| 3,598,319 A | * | 8/1971 | Howald | F02K 1/123 239/265.19 |
| 5,161,741 A | * | 11/1992 | Seyfang | B64C 15/02 239/265.35 |
| 5,251,846 A | * | 10/1993 | Rethorst | G11B 27/11 244/15 |
| 5,992,792 A | * | 11/1999 | Arnason | B64C 9/38 244/13 |
| 2005/0223694 A1 | * | 10/2005 | Bryant | B64C 29/0025 60/228 |
| 2007/0252032 A1 | * | 11/2007 | Lawson | B64D 27/20 244/12.3 |

(Continued)

FOREIGN PATENT DOCUMENTS

| | | | |
|---|---|---|---|
| DE | 10 2013 020 778 A1 | 6/2015 | |
| DE | 10 2014 015 662 A1 | 5/2016 | |
| GB | 1605235 A * | 6/1985 | ............. B64C 9/326 |

*Primary Examiner* — Richard R. Green
*Assistant Examiner* — William L Gmoser
(74) *Attorney, Agent, or Firm* — Collard & Poe, P.C.

(57) ABSTRACT

An aircraft includes a fuselage having a wing profile. An apparatus for thrust reversal is disposed on the tail of the aircraft. Air feed takes place from the outside, by way of a braking flap with an air intake channel and/or from a propelling machine.

3 Claims, 2 Drawing Sheets

(56) References Cited

U.S. PATENT DOCUMENTS

| | | | | |
|---|---|---|---|---|
| 2008/0283677 A1* | 11/2008 | Pederson | ............... | B64C 30/00 |
| | | | | 244/73 R |
| 2015/0337762 A1* | 11/2015 | Penda | ...................... | F02K 1/70 |
| | | | | 415/123 |
| 2017/0191447 A1* | 7/2017 | Osman | ...................... | F02K 1/82 |
| 2019/0234308 A1* | 8/2019 | Dierksmeier | ............. | F02K 7/16 |

* cited by examiner

THRUST REVERSAL ON AIRCRAFT FUSELAGE WITH A WING PROFILE

CROSS REFERENCE TO RELATED APPLICATIONS

Applicant claims priority under 35 U.S.C. 119 of German Application No. 10 2018 001 247.7 filed on Feb. 16, 2018, the disclosure of which is herein incorporated by reference.

BACKGROUND OF THE INVENTION

1. Field of the Invention

The invention relates to aircraft which travel at speeds of up to supersonic speeds and which include a braking and landing system.

2. The Prior Art

German Patent Application No. 10 2013 020 778.9 describes an apparatus for vertical take-off of a vehicle.

German Patent Application No. 10 2014 015 662.1 shows a vehicle for traveling at supersonic speeds with structure configured to provide the possibility of thrust and counter-thrust. There can be problems in connection with braking and landing of these vehicles.

SUMMARY OF THE INVENTION

A goal of the invention is to give an aircraft an additional braking and landing system.

An aircraft according to the invention includes a fuselage, a propelling machine in the fuselage, a tail, a first air supply channel, a second air supply channel, a braking flap, a plurality of nose deflection flaps, and an exhaust gas channel. The fuselage has a nose and a wing profile. The propelling machine is for propelling the aircraft up to hypersonic speed. The tail is connected to the fuselage and includes a plurality of tail deflection flaps movable between an open position and a closed position. The first air supply channel is disposed in the fuselage and is connected and supplies air to the propelling machine. The first air supply channel has an air inlet opening. The second air supply channel is disposed in the fuselage. The second air supply channel is connected and supplies air to the tail. The braking flap is connected to the second air supply channel. The braking flap is movable between an open position and a closed position. The nose deflection flaps are movable between an open position and a closed position. The exhaust gas channel is disposed in the fuselage, is connected to the propelling machine, and extends toward the nose. Opening the braking flap and the tail deflection flaps causes a thrust reversal on the tail.

In another embodiment, the aircraft also includes a further exhaust channel disposed in the fuselage. The further exhaust channel is connected to the propelling machine and extends toward the tail deflection flaps.

In another embodiment, the propelling machine of the aircraft includes a gas turbine.

BRIEF DESCRIPTION OF THE DRAWINGS

Other objects and features of the present improvements will become apparent from the following detailed description and the related accompanying drawings. However, these accompanying drawings are designed for the purpose of illustration only, rather than limiting the present utility model.

In these accompanying drawings, similar reference characters denote similar elements throughout the views.

DETAILED DESCRIPTION OF THE INVENTION

The present invention will be further described below in detail by embodiments with reference to the accompanying drawings, and the protection scope of the present invention is not limited thereto.

Figure 1:
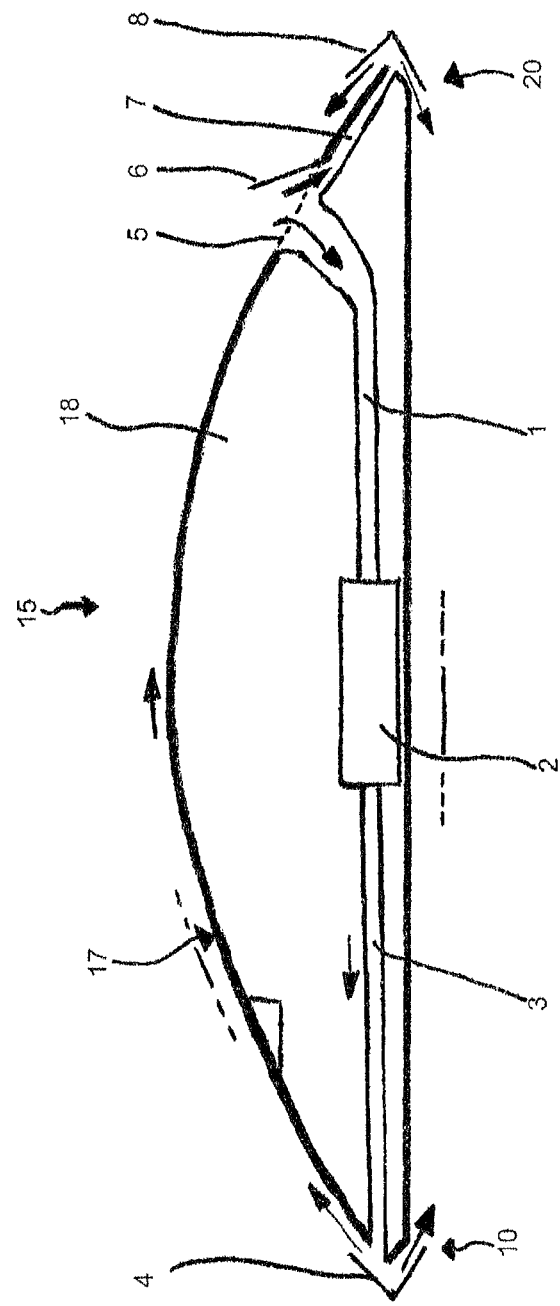
FIG. 1 is a side view of a first embodiment of an aircraft according to the invention.

The aircraft 15 shown in FIG. 1 includes a fuselage 18, a propelling machine 2 in the fuselage 18, a tail 20, a first air supply channel 1, a second air supply channel 7, a braking flap 6, a plurality of nose deflection flaps 4, and an exhaust gas channel 3. The fuselage 18 has a nose 10 and a wing profile 17. The propelling machine 2 is for propelling the aircraft 15 up to hypersonic speed. The tail 20 is connected to the fuselage 18 and includes a plurality of tail deflection flaps 8 movable between an open position and a closed position. The first air supply channel 1 is disposed in the fuselage 18 and is connected and supplies air to the propelling machine 2. The first air supply channel 1 has an air inlet opening 5. The second air supply channel 7 is disposed in the fuselage 18. The second air supply channel 7 is connected and supplies air to the tail 20. The braking flap 6 is connected to the second air supply channel 7. The braking flap 6 is movable between an open position and a closed position, with the braking flap 6 being shown in the open position in FIG. 1. The nose deflection flaps 4 are movable between an open position and a closed position. The exhaust gas channel 3 is disposed in the fuselage 18, is connected to the propelling machine 2, and extends toward the nose 10. Opening the braking flap 6 and the tail deflection flaps 8 causes a thrust reversal on the tail 20.

In the aircraft shown in FIG. 1, the propelling machine 2 of the aircraft 15 is a gas turbine.

Take-off takes place by way of the gas turbine sucking in air via a first air supply channel 1 and the air intake opening 5. The gas turbine produces pressurized air, and that pressurized air is guided to the nose 10 via the exhaust gas channel 3. The escaping pressurized air escapes at the nose 10 and is led over the wing profile 17 and under the wing profile 17 of the fuselage 18. The escaping air moves with high velocity from 0 up to around 1000 km/h as needed. The deflection flap 4 is open for the take-off, and the braking flap 6 and the deflection flap 8 at the tail 20 are closed for the take-off. The landing follows in reversed manner via counter-thrust and exiting of the reduced compressed air at the nose 10.

Braking and landing of the aircraft takes place via opening the braking flap 6 and opening the deflection flap 8. Thrust reversal takes place.

Lift is ensured via the fuselage 18 having a wing profile 17.

Figure 2:
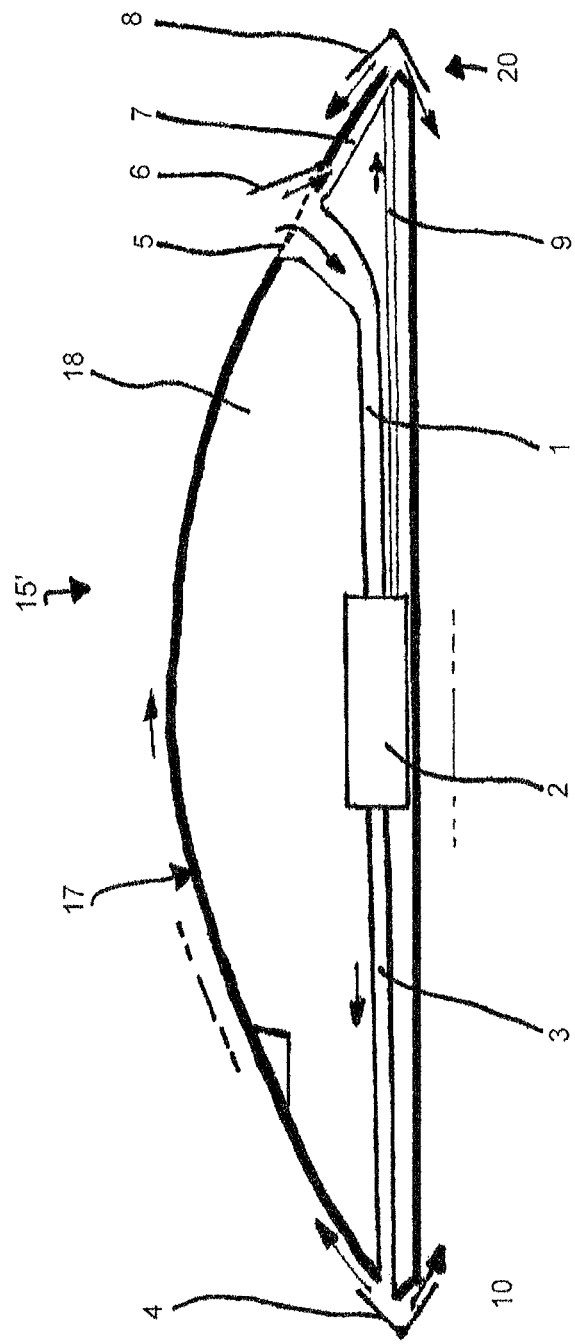
FIG. 2 is a side view of another embodiment of an aircraft according to the invention.

In the further embodiment shown in FIG. 2, the structure and function of the aircraft 15' are similar to those of the aircraft 15 shown in FIG. 1. The aircraft 15' shown in FIG. 2 also includes, however, a further exhaust gas channel 9.

The further exhaust gas channel 9 is connected to the propelling machine 2 and extends toward the tail deflection flaps 8.

REFERENCE SYMBOL LIST 1 first air supply channel
2 gas turbine
3 exhaust gas channel
4 deflection flap on nose
5 air intake opening
6 braking flap
7 second air supply channel to tail
8 deflection flap on tail
9 further exhaust gas channel
10 nose
15, 15' aircraft
17 wing profile
18 fuselage
20 tail

What is claimed is:

1. An aircraft comprising:
(a) a fuselage having a nose and a wing profile;
(b) a propelling machine in the fuselage for propelling the aircraft up to hypersonic speed;
(c) a tail connected to the fuselage, the tail comprising a plurality of tail deflection flaps movable between an open position and a closed position;
(d) a first air supply channel disposed in the fuselage, wherein the first air supply channel is connected and supplies air to the propelling machine, the first air supply channel having an air inlet opening;
(e) a second air supply channel disposed in the fuselage, wherein the second air supply channel is connected and supplies air to the tail;
(f) a braking flap connected to the second air supply channel, wherein the braking flap is movable between an open position and a closed position;
(g) a plurality of nose deflection flaps on the nose, wherein the nose deflection flaps are movable between an open position and a closed position; and
(h) an exhaust gas channel disposed in the fuselage, wherein the exhaust gas channel is connected to the propelling machine and extends toward the nose;
wherein for aircraft take-off the nose deflection flaps are open, the tail deflection flaps are closed, and the braking flap is closed, and take-off takes place in such a way that the propelling machine sucks in air via the first air supply channel and the air inlet opening, the propelling machine pressurizes the air, the pressurized air is guided to the nose via the exhaust gas channel, the pressurized air escapes at the nose and is led by the nose deflection flaps over the wing profile and under the wing profile of the fuselage;
wherein lift is ensured via the fuselage having the wing profile: and
wherein opening the braking flap and the tail deflection flaps causes a thrust reversal on the tail for braking and landing of the aircraft.

2. The aircraft according to claim 1, further comprising a further exhaust channel disposed in the fuselage, wherein the further exhaust channel is connected to the propelling machine and extends toward the tail deflection flaps.

3. The aircraft according to claim 1, wherein the propelling machine comprises a gas turbine.

* * * * *